US012737758B2

(12) United States Patent
Chen et al.

(10) Patent No.: US 12,737,758 B2
(45) Date of Patent: Sep. 15, 2026

(54) TAP-TO-VERIFY PROOF OF PAYMENT CHALLENGE

(71) Applicant: DoorDash, Inc., San Francisco, CA (US)

(72) Inventors: Peyton Chih Yuan Chen, Cupertino, CA (US); Travis Ryan Stine, Redwood City, CA (US); Megha Agarwal, Redwood City, CA (US); Thomas Chen, Belmont, CA (US); Jason Joseph Gregory, Amherst, NY (US); Kaiven Zhou, San Francisco, CA (US); Pratik Mayur Parekh, San Mateo, CA (US); Grace Lim, Inglewood, CA (US)

(73) Assignee: DoorDash, Inc., San Francisco, CA (US)

( * ) Notice: Subject to any disclaimer, the term of this patent is extended or adjusted under 35 U.S.C. 154(b) by 4 days.

(21) Appl. No.: 18/514,241

(22) Filed: Nov. 20, 2023

(65) Prior Publication Data

US 2025/0086625 A1 Mar. 13, 2025

Related U.S. Application Data

(60) Provisional application No. 63/581,508, filed on Sep. 8, 2023.

(51) Int. Cl.

| | |
|---|---|
| ***G06Q 20/40*** | (2012.01) |
| ***G06Q 20/32*** | (2012.01) |
| ***G06Q 20/34*** | (2012.01) |
| ***G06Q 20/38*** | (2012.01) |

(52) U.S. Cl.

CPC ......... *G06Q 20/40* (2013.01); *G06Q 20/3278* (2013.01); *G06Q 20/352* (2013.01); *G06Q 20/385* (2013.01)

(58) Field of Classification Search

CPC .. G06Q 20/40; G06Q 20/3278; G06Q 20/352; G06Q 20/385

USPC ........................................................... 705/44

See application file for complete search history.

(56) References Cited

U.S. PATENT DOCUMENTS

| | | | |
|---|---|---|---|
| 6,384,850 B1 | 5/2002 | McNally et al. | |
| 6,871,325 B1 | 3/2005 | McNally et al. | |
| 6,982,733 B1 | 1/2006 | McNally et al. | |
| 8,146,077 B2 | 3/2012 | McNally et al. | |
| 9,009,060 B2 | 4/2015 | McNally | |
| 9,747,651 B2 | 8/2017 | McNally | |
| 10,827,092 B1 * | 11/2020 | Bier .................. | H04N 1/32776 |
| 10,970,797 B2 | 4/2021 | McNally | |
| 11,276,130 B2 | 3/2022 | McNally | |
| 11,842,415 B2 | 12/2023 | McNally | |
| 11,847,587 B1 | 12/2023 | McNally | |

(Continued)

OTHER PUBLICATIONS

Anderson, R.J. (1999). The Formal Verification of a Payment System. In: Hinchey, M.G., Bowen, J.P. (eds) Industrial-Strength Formal Methods in Practice. Formal Approaches to Computing and Information Technology (FACIT). Springer, London. https://doi.org/10.1007/978-1-4471-0523-7_3, 11 pgs.

(Continued)

*Primary Examiner* — Hai Tran

(74) *Attorney, Agent, or Firm* — Kwan & Olynick LLP

(57) ABSTRACT

This disclosure relates to verifying possession of a card via a tap gesture of the card in relation to a mobile device supporting Near-Field Communication (NFC) functionality.

20 Claims, 5 Drawing Sheets

(56) References Cited

U.S. PATENT DOCUMENTS

| | | | | |
|---|---|---|---|---|
| 2020/0052905 | A1* | 2/2020 | Mathias | H04L 9/0861 |
| 2022/0076240 | A1* | 3/2022 | Ghani | G06Q 20/12 |
| 2022/0261786 | A1* | 8/2022 | Arora | G06Q 20/3223 |

OTHER PUBLICATIONS

B. Rajagopalan, et al., A Lightweight Payment Verification Using Blockchain Algorithm on IoT Devices, International Research Journal of Engineering and Technology, (IRJET) e-ISSN: 2395-0056, vol. 09 Issue: 05 | May 2022, 4 pgs.

* cited by examiner

100

System 700

Processor 701

Memory 703

Bus 715

Interface 711

FIG. 4

TAP-TO-VERIFY PROOF OF PAYMENT CHALLENGE

RELATED APPLICATIONS

This application claims priority from U.S. Patent Application No. 63/581,508, by Peyton Chih Yuan Chen et al, entitled "Tap To Verify Proof of Payment Challenge," filed on Sep. 9, 2023, which is incorporated herein by reference.

TECHNICAL FIELD

The present disclosure relates to use of Near-Field Communication (NFC) to verify ownership of a NFC-enabled card such as a credit card. In one example, the present disclosure relates to mechanisms and processes for verifying physical possession of a card using a challenge and response.

BACKGROUND

NFC payments occur when customers hold an NFC-enabled device or card in close proximity to a card reader or payment terminal that also has NFC capabilities. After a quick tap or a close hover (usually no more than a few centimeters away), payment details are transmitted by radio frequency, and the transaction is completed quickly and securely. NFC technology enables any mobile wallet app, such as Apple Pay and Google Pay, as well as credit cards that are equipped with a "tap to pay" option.

BRIEF DESCRIPTION OF THE DRAWINGS

The disclosure may best be understood by reference to the following description taken in conjunction with the accompanying drawings, which illustrate particular embodiments of the present disclosure.

FIG. 4 illustrates a particular example of a computer system that can be used with various embodiments of the present disclosure

DETAILED DESCRIPTION OF PARTICULAR EMBODIMENTS

Figure 1A:
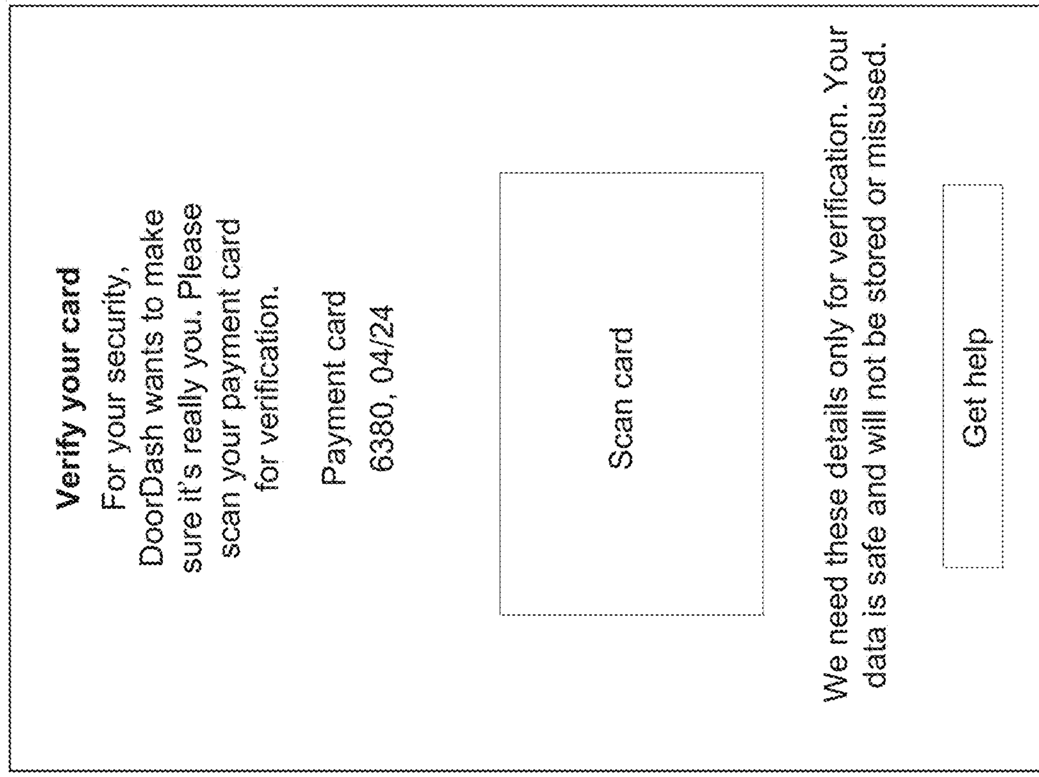
FIG. 1A illustrates an example of a graphical user interface (GUI) presented to verify a card through card scanning, in some implementations.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present disclosure will be described in the context of particular protocols, such as Near-Field Communication (NFC), Wi-Fi or Bluetooth. However, it should be noted that the techniques of the present disclosure may also be applied to variations of protocols. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Fraudsters will sometimes claim that they own a card they do not. When the system determines that there is risk, it is desirable to prove ownership of the card. In some embodiments, the system verifies that the customer actually owns the card with which the customer is trying to checkout with a proof of payment challenge. Because the vast majority of payment fraud is committed using the card information and not the physical card, having the physical and authentic payment card in possession is accepted as proof of ownership.

Previous approaches to verifying ownership include scanning the credit card and running optical character recognition (OCR) to extract card data from an image of the credit card, then running the card data extracted from the image through a fake detection machine learning (ML) model. Unfortunately, this process depends on the quality of the ML model that is used.

FIG. 1A illustrates an example of a graphical user interface (GUI) presented to verify a card through card scanning, in some implementations. As shown in this example, to verify possession and authenticity of a card, the user may be prompted to scan the card. A photograph of the card is captured and analysis of the photograph may be facilitated via a machine learning model, as described above. Unfortunately, such a machine learning model is prone to errors.

EXAMPLE EMBODIMENTS

The disclosed embodiments support Tap to Pay functionality on consumer mobile devices using Near-Field Communication (NFC). This Tap to Pay functionality is leveraged to implement a challenge-response rather than complete a card payment. More particularly, the ProximityReader iOS framework supports Tap to Pay on iPhone, which allows a person's iPhone to act as a point-of-sale device without additional hardware. To enable tap to pay functionality, coordination with a participating payment service provider that is Level 3 certified is further implemented. Similar capabilities are supported by Android mobile devices.

Figure 1B:
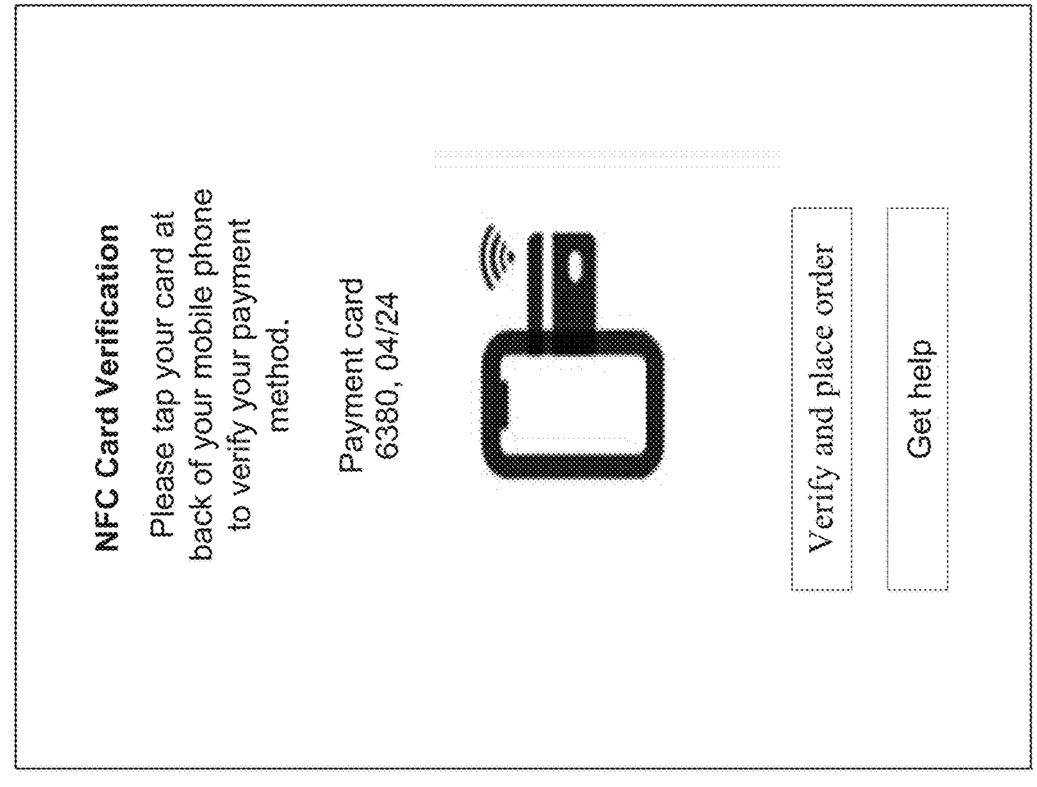
FIG. 1B illustrates another example of a GUI to initiate card verification through Near-Field Communication (NFC), in accordance with one or more embodiments.

In some implementations, physical possession of a card can be verified through Near-Field Communication (NFC). FIG. 1B illustrates an example of a GUI that the service renders to initiate card verification through NFC, in accordance with some embodiments. Upon determination that card verification through NFC is appropriate, the service provides the GUI for rendering via the user's mobile device.

A Near-Field Communication (NFC)-enabled card is held in close proximity to a card reader, payment terminal, or mobile device that also has NFC capabilities. The user is prompted to tap-to-verify, leveraging recently released tap-to-pay technology on both iOS and Android to verify a customer's payment by having them tap their EMV-enabled credit card against the NFC chip on the back of the device (e.g., mobile phone) to verify the token. The token may be sent to a provider such as the card issuer for verification of the card. Upon verification by the provider, a message confirming successful verification is transmitted to the system.

Using NFC to verify one owns the card they are paying with is an efficient process. However, using tap to pay is a feature only recently made available on iOS 15.4+ and Android devices. Thus, unfortunately, NFC is not enabled on all mobile devices. Moreover, not all credit/debit cards have Europay, Mastercard and Visa (EMV) chips. In addition, tap to pay is currently only available for use by companies who have a direct relationship with issuers (Visa, Mastercard, American Express, Discover) or companies that they partner with (e.g., DoorDash). Therefore, there are some drawbacks to implementing NFC technology.

Figure 2:
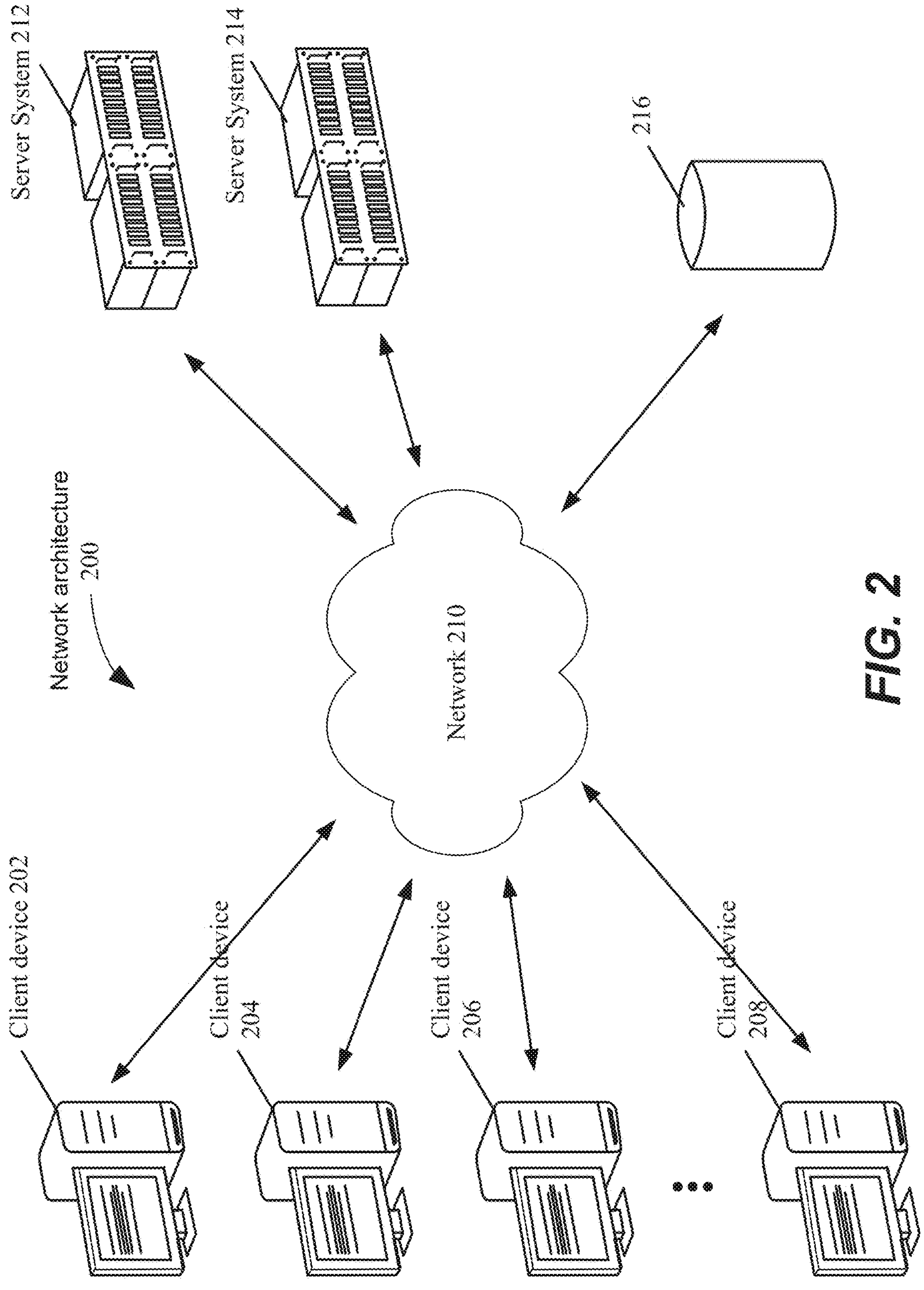
FIG. 2 is an example network that may be implemented in some embodiments.

The disclosed embodiments may be implemented in a network via which credit card transactions may be facilitated. In various embodiments, information may be transmitted to or from client devices corresponding to customers, merchants, or couriers. FIG. 2 illustrates a diagram of an example network architecture 200 for implementing various systems and methods of the present disclosure, in accordance with some embodiments. The network architecture 200 includes a number of client devices 202-208 communicably connected to one or more server systems 212 and 214 by a network 210. In some implementations, client devices 202-208 include mobile devices.

In some embodiments, server systems 212 and 214 include one or more processors and memory. The processors of server systems 212 and 214 execute computer instructions (e.g., network computer program code) stored in the memory to perform functions of a network data exchange server. In various embodiments, the functions of the network data exchange server may include online orders for delivery of goods, and/or predicting and dynamically updating estimated time of arrivals (ETAs) for such deliveries.

In some embodiments, server system 212 is a content server configured to receive and store network information. In some embodiments, server system 214 is a dispatch server configured to transmit and/or route network data packets including network messages. In some embodiments, content server 210 and dispatch server 212 are configured as a single server system that is configured to perform the operations of both servers.

In some embodiments, the network architecture 200 may further include a database 216 communicably connected to client devices 202-208 and server systems 212 and 214 via network 210. In some embodiments, network data, or other information such as user information, courier information, and/or merchant information, may be stored in and/or retrieved from database 216.

Users of the client devices 202-208 can access the server system 212 to participate in a network data exchange service. For example, the client devices 202-208 can execute web browser applications that can be used to access the network data exchange service. In another example, the client devices 202-208 can execute software applications that are specific to the network (e.g., networking data exchange "apps" running on smartphones).

Users interacting with the client devices 202-208 can participate in the network data exchange service provided by the server system 212 by distributing digital content, such as text comments (e.g., updates, announcements, replies), digital photos, videos, online orders, payment information, account updates, location information, or other appropriate electronic information. In some implementations, information can be posted on a user's behalf by systems and/or services external to the network or the server system 212. For example, the user may post a review of a restaurant to a restaurant review website, and with proper permissions, that website may cross-post the review to the network on the user's behalf. In another example, a software application executed on a mobile device, with proper permissions, may use global positioning system (GPS) capabilities to determine the user's location and automatically update the network with his location (e.g., "At Home", "At Work", "In San Francisco, Cal.").

In some implementations, the client devices 202-208 can be computing devices such as laptop or desktop computers, smartphones, personal digital assistants, portable media players, tablet computers, or other appropriate computing devices that can be used to communicate with an electronic social network. In some implementations, any of client devices 202-208 can include mobile devices that are Near-Field Communication (NFC)-enabled devices.

In some implementations, the server system 212 can include one or more computing devices such as a computer server. In various embodiments, each of client devices 202-208 may be any one of merchant devices corresponding to merchants 110-116, courier devices corresponding to couriers 120-128, or customer devices corresponding to customers 130-136.

In some implementations, the server system 212 can represent more than one computing device working together to perform the actions of a server computer (e.g., cloud computing). In some implementations, the network 210 can be a public communication network (e.g., the Internet, cellular data network, dial-up modems over a telephone network) or a private communications network (e.g., private LAN, leased lines).

In some implementations, the server system 212 includes a provider such as a gateway provider and/or a card issuer. An ephemeral token can be transmitted either directly to a card issuer or indirectly to the card issuer via a gateway provider. Upon verification of the token by the card issuer, a message confirming such verification can be returned to the system.

Various customers, merchants, and couriers may transmit and receive information related to one or more orders to the servers 212 or 214 via corresponding client devices. The system may then utilize information received from various devices to calculate the ETA of the delivery of the order, as well as dynamically updating the ETA when updated timestamps are received. The predicted ETAs may further be used by a delivery routing system for pairing orders to couriers and merchants for delivery. Such information may include order information, payment information, account updates, timestamps, location information, or other appropriate electronic information. For example, a selection of one or more merchants may be received from a customer device with a request to view available items for order. Information corresponding to the selected merchants may be retrieved from database 216 and transmitted to the customer device.

Figure 3:
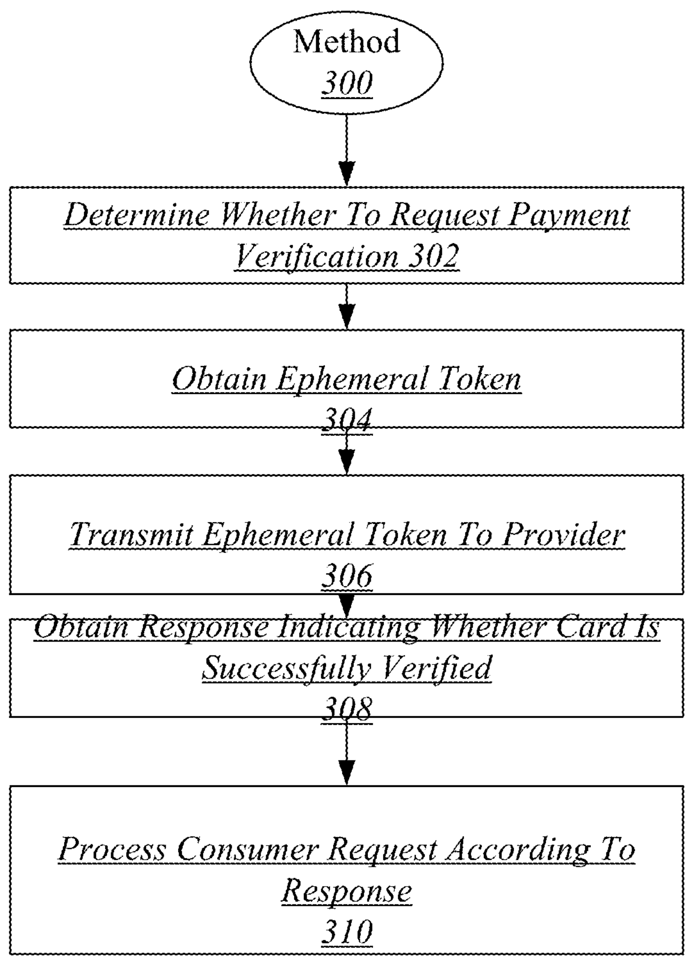
FIG. 3 is an example of a process flow diagram illustrating an example method of implementing card verification, in accordance with one or more embodiments.

FIG. 3 is an example of a process flow diagram illustrating an example method of implementing card verification, in accordance with one or more embodiments. A user may be attempting to submit a consumer request (e.g., via a NFC-enabled mobile device or via a separate device). The consumer request can include, for example, an attempt to add their card as a payment method to their consumer account, a request to checkout, or a request to unlock their consumer account.

The system may determine whether to request payment card verification at 302 via NFC technology. In some implementations, the system may determine whether to request payment card verification in response to the consumer request.

In some implementations, the system determines that requesting payment card verification is appropriate due to receipt of a category of consumer request. For example, the system may determine that payment card verification is appropriate if the consumer has submitted a checkout request. As another example, the system may determine that payment card verification is appropriate if the consumer has asked to unlock their account or add a payment method to their account. As yet another example, the system may determine that payment card verification is appropriate if a consumer or courier is picking up an order from a business (e.g., by tapping the courier's or consumer's phone to a merchant's device to verify that the order has been picked up). As yet another example, the system may determine that payment card verification is appropriate if fraud is suspected.

In some implementations, the system may determine that requesting payment card verification is appropriate for transactions that are considered high risk. Thus, the system may determine whether the current transaction or the consumer request is a high risk transaction. A high risk transaction can include a transaction that reaches or surpasses a verification threshold such as a particular monetary amount. Alternatively, a high risk transaction can include a transaction made by a particular individual. As further examples, a high risk transaction can include a transaction for a particular class of goods (e.g., consumer electronics).

In some implementations, if a transaction is considered a low risk transaction or it meets a lower threshold, the system may request that the user scan in their card to facilitate card verification. The lower threshold can include a lower monetary threshold or a class of good.

In some implementations, the system may determine whether to request payment card verification via scanning the card rather than NFC technology. In some embodiments, the system may detect instances in which the user's card does not have an EMV chip or their mobile device is not NFC-enabled. In these instances, the system asks the user to scan their card to authenticate the card.

In some implementations, the system may enable the user to choose to verify their card via scanning their card (e.g., if they are aware that their card or device do not support NFC verification).

Responsive to determining to request payment card verification, the system provides a graphical user interface (GUI) requesting payment card verification at 304. The GUI may be rendered via the NFC-enabled mobile device. For example, the user may be prompted to position and tap their card on the back of their mobile device or on the front of the mobile device (e.g., on a corner of the device where a NFC chip is positioned).

Responsive to a signal transmitted by a physical payment card in proximity to a Near-Field Communication (NFC)-enabled mobile device, an ephemeral token is obtained from the card at 304. More particularly, encrypted card information may be sent using NFC technology between the card and a contactless reader implemented on the mobile device. In some embodiments, the card has a Europay, Mastercard, and Visa (EMV) chip. The payment card can include a credit card, a debit card, or other form of card such as a gift card.

The token is then transmitted by the system to a provider at 306. A provider can include a gateway provider such as Stripe, which forwards the token to a monetary provider/card issuer. Alternatively, the token can be transmitted directly to a provider, which includes a monetary provider/card issuer. Rather than implementing a purchase, the token is used to facilitate a challenge-response.

The system obtains a response from the provider at 308. The response may indicate whether the card has been successfully verified.

In some implementations, the challenge-response includes charging a nominal amount and reversing the amount. For example, an amount of $0.01 may be charged and then reversed. In some implementations, the challenge-response includes authentication.

The system then processes a consumer request according to the response at 310. In some implementations, the consumer request includes a request to add a payment method (e.g., card) to an account. Thus, if the response indicates that the card was successfully verified, the card can be added as a payment method to a consumer account. Similarly, if the consumer request is a request to checkout using the card (instead of a stored payment method), the system can complete the checkout using the card if the response indicates that the card was successfully verified.

In other implementations, the request can include a request to unlock a consumer account. For example, if the account is locked, the system may require that a card be verified (e.g., via proof of ownership of the physical card) to unlock the account. Card information associated with the card may then be stored in the account. Therefore, the system can unlock the account if the card is successfully verified Through the use of the disclosed embodiments to verify a physical card is a quick process. Moreover, the user pass rate of "good" users is greater than that of ML model implementations. Similarly, the user pass rate of "bad" users is lower than that of ML model implementations.

Figure 4:
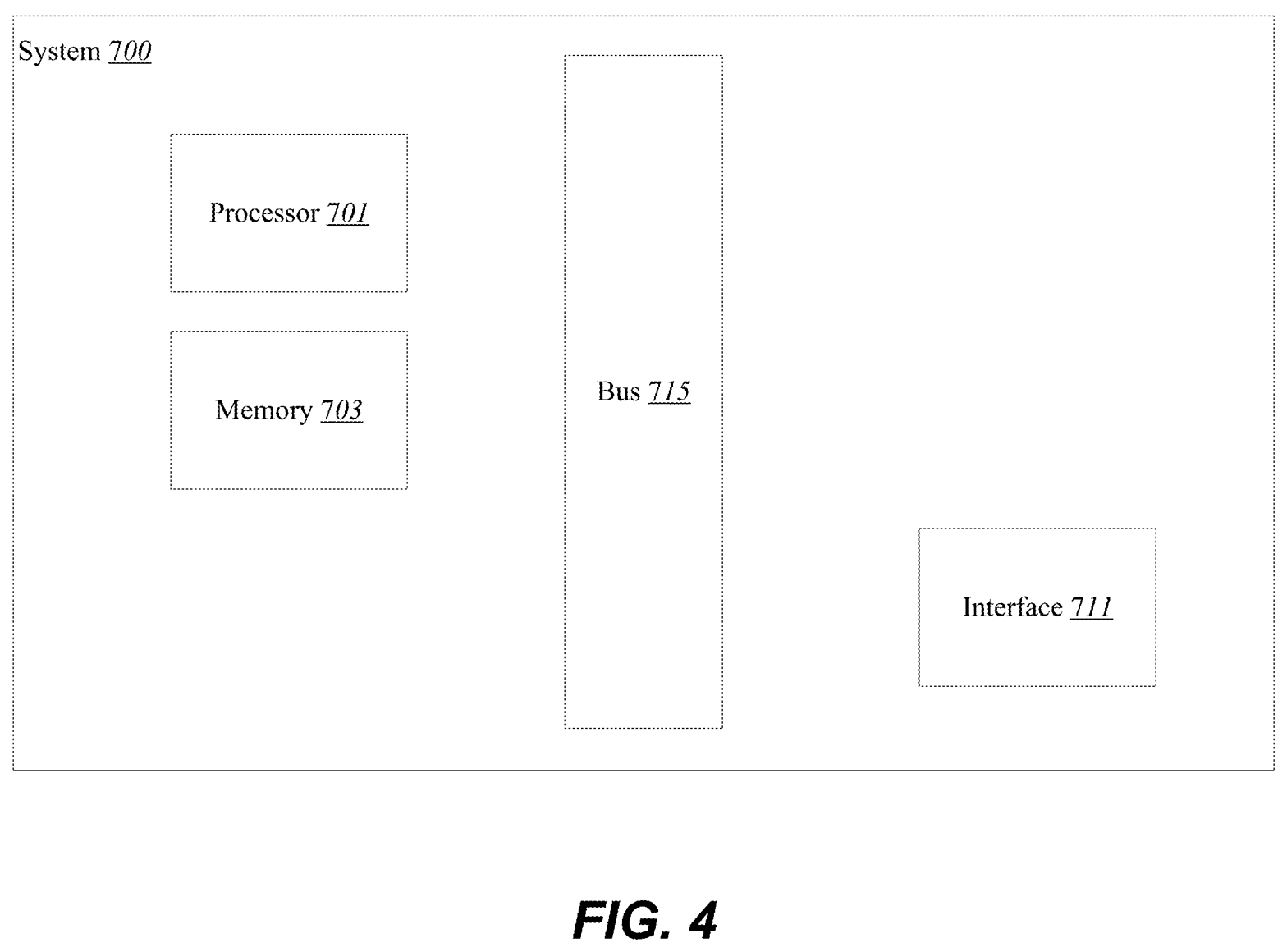

Various computing devices can implement the methods described herein. For instance, a mobile device, computer system, etc. can be used to verify possession and authenticity of a card. With reference to FIG. 4, shown is a particular example of a computer system 700 that can be used to implement particular examples of the present disclosure. According to particular example embodiments, a system 700 suitable for implementing particular embodiments of the present disclosure includes a processor 701, a memory 703, an interface 711, and a bus 715 (e.g., a PCI bus). When acting under the control of appropriate software or firmware, the processor 701 is responsible for processing ephemeral tokens or other messages as described herein. In some embodiments, the processor is responsible for updating the parameters of machine learning algorithms. Various specially configured devices can also be used in place of a processor 701 or in addition to processor 701. The complete implementation can also be done in custom hardware.

The interface 711 is typically configured to send and receive data packets or data segments over a network. Particular examples of interfaces the device supports include Ethernet interfaces, frame relay interfaces, cable interfaces, DSL interfaces, token ring interfaces, and the like. The interface 711 may include separate input and output interfaces, or may be a unified interface supporting both operations. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions for operations including determining whether to proceed with verification of a card via NFC. The program instructions may control the operation of an operating system and/or one or more applications, for example. The memory or memories may also be configured to store received metadata and batch requested metadata. The memory or memories may also be configured to store data corresponding to parameters and weighted factors.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A method, comprising:

determining, at a mobile device, that requesting payment card verification is appropriate for a current transaction requested via the mobile device, the mobile device being a mobile phone;

determining, at the mobile device, whether to request payment card verification via Near-Field Communication (NFC) technology, wherein determining whether to request payment card verification via NFC technology includes determining whether the mobile device is NFC-enabled;

responsive to determining to request payment card verification via Near-Field Communication (NFC) technology, rendering via the mobile device a graphical user interface (GUI) requesting payment card verification by tapping a card against the mobile device, wherein determining to request payment card verification via NFC technology includes determining that the mobile device is NFC-enabled;

after determining that the mobile device is NFC-enabled, obtaining, at the mobile device, an ephemeral token from a payment card in close proximity to the mobile device;

transmitting at the mobile device the ephemeral token to a provider, the ephemeral token operating as a challenge of a challenge-response;

obtaining at the mobile device a response of the challenge-response from the provider, the response indicating whether the payment card has been successfully authenticated; and processing at the mobile device the current transaction according to the response.

2. The method of claim 1, the current transaction being a request to add a payment method to a consumer account in a network system facilitating online orders, the payment method including the payment card.

3. The method of claim 1, the current transaction being a request to checkout in a network system facilitating online orders using the payment card.

4. The method of claim 1, the current transaction being a request to unlock a consumer account, wherein the consumer account is locked if proof of ownership of the payment card is required to unlock the consumer account.

5. The method of claim 1, the provider being a gateway provider.

6. The method of claim 1, the provider being a card issuer.

7. The method of claim 1, wherein determining that requesting payment verification is appropriate includes determining whether a verification threshold has been reached.

8. The method of claim 1, the current transaction pertaining to a particular individual or category of goods.

9. A system including memory and a processor configured to cause:

determining, at a mobile device, that requesting payment card verification is appropriate for a current transaction requested via the mobile device, the mobile device being a mobile phone;

determining, at the mobile device, whether to request payment card verification via Near-Field Communication (NFC) technology, wherein determining whether to request payment card verification via NFC technology includes determining whether the mobile device is NFC-enabled;

responsive to determining to request payment card verification via Near-Field Communication (NFC) technology, rendering via the mobile device a graphical user interface (GUI) requesting payment card verification by tapping a card against the mobile device, wherein determining to request payment card verification via NFC technology includes determining that the mobile device is NFC-enabled;

after determining that the mobile device is NFC-enabled, obtaining, at the mobile device, an ephemeral token from a payment card in close proximity to the mobile device;

transmitting at the mobile device the ephemeral token to a provider, the ephemeral token operating as a challenge of a challenge-response;

obtaining at the mobile device a response of the challenge-response from the provider, the response indicating whether the payment card has been successfully authenticated; and processing at the mobile device the current transaction according to the response.

10. The system of claim 9, the current transaction being a request to add a payment method to a consumer account in a network system facilitating online orders, the payment method including the payment card.

11. The system of claim 9, the current transaction being a request to checkout in a network system facilitating online orders using the payment card.

12. The system of claim 9, the current transaction being a request to unlock a consumer account, wherein the consumer account is locked if proof of ownership of the payment card is required to unlock the consumer account.

13. The system of claim 9, the provider being a gateway provider.

14. The system of claim 9, the provider being a card issuer.

15. The system of claim 9, wherein determining whether to request payment verification includes determining whether a verification threshold has been reached.

16. A computer program product comprising one or more non-transitory computer readable media having instructions stored thereon for performing a method, the method comprising:

determining, at a mobile device, that requesting payment card verification is appropriate for a current transaction requested via the mobile device, the mobile device being a mobile phone;

determining, at the mobile device, whether to request payment card verification via Near-Field Communication (NFC) technology, wherein determining whether to request payment card verification via NFC technology includes determining whether the mobile device is NFC-enabled;

responsive to determining to request payment card verification via Near-Field Communication (NFC) technology, rendering via the mobile device a graphical user interface (GUI) requesting payment card verification by tapping a card against the mobile device, wherein determining to request payment card verification via NFC technology includes determining that the mobile device is NFC-enabled;

after determining that the mobile device is NFC-enabled, obtaining, at the mobile device, an ephemeral token from a payment card in close proximity to the mobile device;

transmitting at the mobile device the ephemeral token to a provider, the ephemeral token operating as a challenge of a challenge-response;

obtaining at the mobile device a response of the challenge-response from the provider, the response indicating whether the payment card has been successfully authenticated; and processing at the mobile device the current transaction according to the response.

17. The computer program product of claim 16, the current transaction being a request to add a payment method to a consumer account in a network system facilitating online orders, the payment method including the payment card.

18. The computer program product of claim 16, the current transaction being a request to checkout in a network system facilitating online orders using the payment card.

19. The computer program product of claim 16, the current transaction being a request to unlock a consumer account, wherein the consumer account is locked if proof of ownership of the payment card is required to unlock the consumer account.

20. The computer program product of claim 16, the provider being a gateway provider.

* * * * *